Oct. 16, 1956     D. J. MUNROE     2,766,840
VIBRATION ABSORBER
Filed April 21, 1951     2 Sheets-Sheet 1
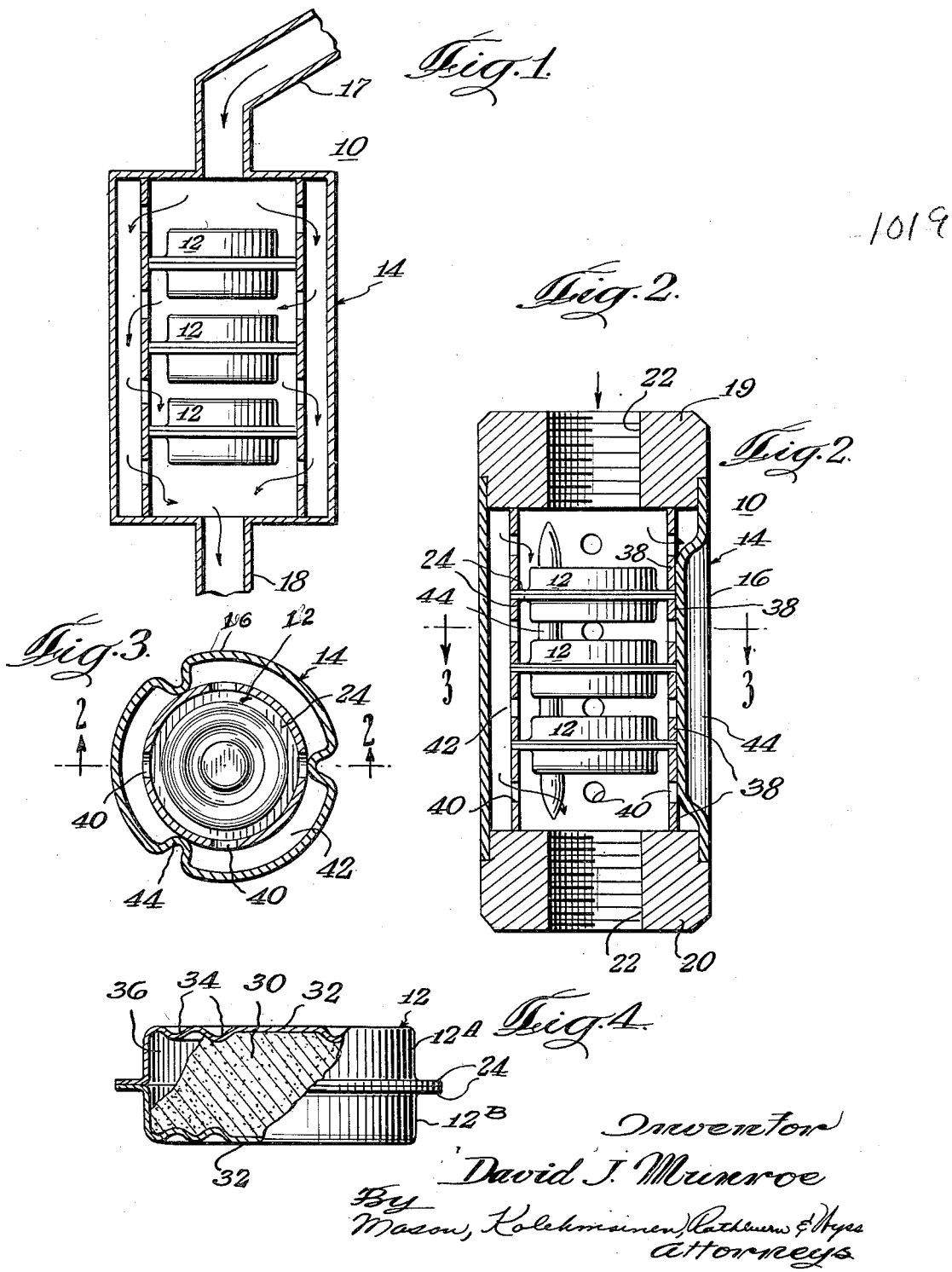
Inventor
David J. Munroe
By Mason, Kolehmainen, Rathburn & Wyss
Attorneys

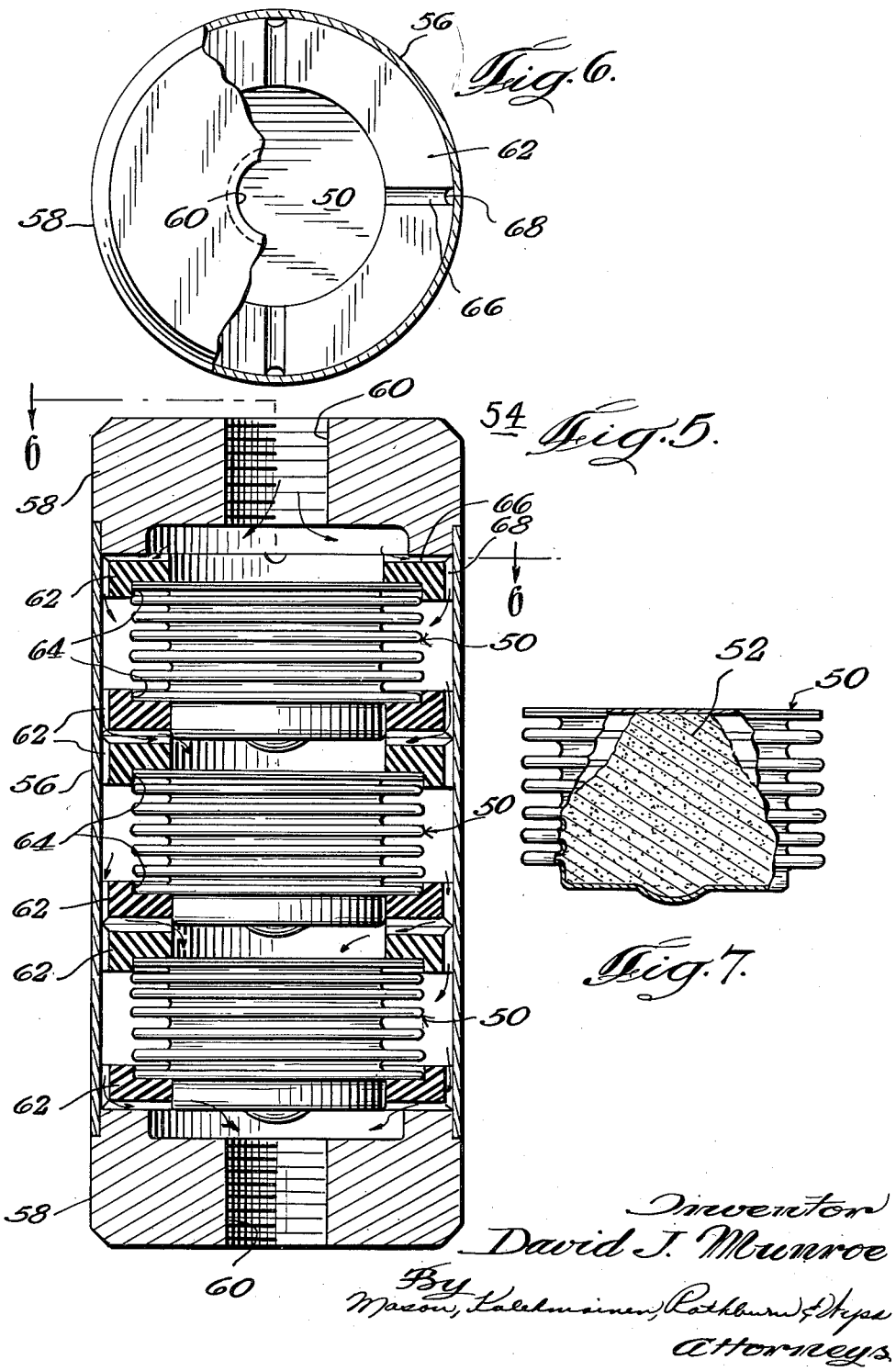

United States Patent Office 2,766,840
Patented Oct. 16, 1956

2,766,840

VIBRATION ABSORBER

David J. Munroe, Racine, Wis., assignor to Webster Electric Company, Racine, Wis., a corporation of Delaware Application April 21, 1951, Serial No. 222,262

13 Claims. (Cl. 181—50)

The present invention relates to a vibration absorber and has for its primary object the provision of a new and improved absorber that is especially effective for use in connection with fluid systems, such, for example, as oil burner fuel supply systems.

Considerable effort has been expended in the part to produce effective vibration absorbers, or noise filters, or sound filters, or pressure compensators, as they are variously called. Heretofore the devices have utilized resilient and compressible materials, but, in accordance with the present invention, there is utilized a nonresilient noncompressible work or energy absorbing material whereby the devices are made more effective and efficient.

Accordingly, it is another object of the present invention to provide a new and improved vibration absorber including a noncompressible and nonresilient work or energy absorbing material.

A further object of the present invention is to provide a capsule-like absorbing unit which is so constructed and arranged that a number of such units can be readily assembled to provide a vibration absorbing apparatus having a desired number of units therein.

A further object of the present invention is to provide a vibration absorbing apparatus including a number of separate units which can be readily assembled and secured to form the apparatus.

In brief, each of the vibration absorbing units of the present invention may be considered to constitute a sealed cell that is substantially, but not entirely, filled with an energy absorbing maerial, preferably silicone grease. There is a sufficient amount of the grease in each cell so that it touches the end walls of the cell, at least one of which is movable as a result of pressure vibrations of the fluid in contact therewith to cause motion of the energy absorbing material. As a result, the grease particles are forced to move and sound energy in the form of pressure waves in the fluid, which may be fuel oil, is converted into heat energy in the silicone. The result is a decrease in the amount of sound energy left in the fluid. The apparatus of the present invention is especially designed for use in connection with fuel units for oil burners, and when used for this purpose, are effective in absorbing noise created by the gear teeth of the pumps. Materials other than silicone grease but possessing similar properties, may be used, for example, elastomers and plain grease.

Other objects and advantages of the present invention will become apparent from the ensuing description of illustrative embodiments thereof, in the course of which reference is had to the accompanying drawings, in which:

Fig. 1 is a diagrammatic fragmentary cross-sectional view of apparatus constructed in accordance with the present invention and installed as in a fuel oil line;

Fig. 2 is an axial cross-sectional view, along the line 2—2 of Fig. 3, through a sound absorbing apparatus constructed in accordance with the present invention;

Fig. 3 is a transverse cross-sectional view taken along the line 3—3 of Fig. 2;

Fig. 4 is a side elevational view partly broken away of one of the individual units of which a number are used in constructing the apparatus shown in Fig. 2;

Fig. 5 is a view similar to Fig. 2 of another embodiment of the present invention;

Fig. 6 is a cross-sectional view taken along the broken line 6—6 of Fig. 5; and

Fig. 7 is a side elevational view, partly broken away of one of the individual units used in constructing the apparatus of Fig. 5.

Referring to the drawings and first to Fig. 1, it may be noted that the sound vibration absorbing apparatus of the present invention is indicated as a whole by reference character 10 and that it comprises a number of individual units 12 mounted in a suitable container or housing 14 in such manner as to be open to fluid over practically their entire exterior area. The housing 14 is suitably connected in a fluid line, such as a fuel oil line, and the fluid is led into the chamber through an inlet conduit 17 and discharged therefrom through an outlet conduit 18. When used with fuel unit installations, the apparatus may be placed at the inlet to the fuel unit, or more particularly, may be placed at the inlet side of the oil strainer. The apparatus may also be placed at the outlet side of the pump as in the so-called bypass line interconnecting the discharge and inlet sides of the pump.

Referring now more particularly to Figs. 2, 3 and 4, it may be noted that the apparatus 10 is simply and economically constructed by making the container or housing 14 of a substantially tubular intermediate portion 16 and a pair of end pieces 19 and 20 provided with central internally threaded openings 22 whereby the device can readily be placed as desired in a fluid line.

One of the features of the present invention resides in the manner in which the apparatus as a whole is constructed from a desired number of the individual units 12 which are so located and held in spaced relation so that their entire or at least effective exteriors are in contact with the fluid passing through the apparatus.

Each of the units 12 is preferably formed from cup shaped parts 12A and 12B having peripheral flanges 24 by means of which they can be brought and held together to form the structure illustrated in Fig. 4. The two parts may be joined together as by brazing or welding, thereby to provide a sealed unit.

In accordance with the present invention, each of the units is substantially but not entirely filled with a non-compressible and nonresilient work or energy absorbing material such as the silicone grease indicated by reference character 30. The silicone grease, it may be noted, is in contact over a substantial portion of the end walls 32 of the unit, one or both of which are made to be readily movable, both being movable in the illustrated device. As the end walls move in response to fluid pressure fluctuations, the silicone grease is moved with the result that the pressure waves creating the sound will be converted into heat energy in the silicone, thus decreasing the amount of sound energy left in the stream of fluid. In order for the device to function properly, not only must the silicone be so located as to be movable by the movements of the movable part of the unit, but some space must be left unfilled by the grease. In Fig. 4, this space is indicated by the reference character 36.

In manufacturing the device illustrated in Fig. 2, the tubular housing wall 16 may be secured, for example, to the end piece 20. The units 12 and associated mounting and spacing means are then placed in the housing. As illustrated the spacing means comprise individual tubular spacers 38 engaging between them the flanges 24 of the units 12.

The flow of fluid in contact with the individual units is insured by providing the tubular spacers 38 with a desired number of apertures or openings 40 and by making the spacers of a diameter somewhat less than the maximum diameter of the intermediate housing portion 16. When this is done, there is formed a longitudinally extending fluid passageway 42 between the spacers 38 and the wall 16.

In accordance with another object of the present invention, concentricity between the spacers and cells on one hand and the chamber wall 16 on the other hand is insured by constructing the housing with a series, such as three, inwardly extending projections 44 which extend inwardly so as to engage and hold the spacers in proper position.

The flanges 24 are sufficiently wide so as to space the side wall portions of the units from the inner walls of the spacers. The spacers are also dimensioned as to space the end walls of the units from each other.

The embodiment of the invention illustrated in Figs. 5, 6 and 7 is constructed along the same principles as that already described. It includes a series of individual units 50 in the form of bellows, as best illustrated in Figs. 7 and 8, and each of which is substantially filled with silicone grease 52 in contact with the opposing end walls of the unit so that movement of the silicone will take place in response to movement of the end walls.

The device as a whole, indicated by reference character 54, includes a tubular intermediate wall portion 56 and opposed end pieces 58 having central internally threaded openings 60.

The individual units are maintained in spaced relationship from each other and from the side walls of the housing by a series of generally flanged spacers 62 having internal peripheral recesses 64 for receiving the ends of the bellows. Only one spacer is utilized at each end of the device, but two are utilized in back-to-back relationship between adjacent units. The spacers have a desired number of both radially and longitudinally extending fluid passages 66 and 68, respectively. It will thus be seen that the construction is such so as to insure flow of fluid through the device in effective contact with the units.

In operation, the devices of both embodiments may be connected as desired in a fluid system. As pointed out in connection with Fig. 1, the connection may be made in the fuel oil line and so that oil enters through a conduit 17 and discharges through a conduit 18. In many cases the oil flows with pressure fluctuations producing an audible sound and which may be created as by the gear teeth of the pump. These sounds are, however, minimized by the devices of the present invention and in an eminently satisfactory and effective manner. The pressure fluctuations cause movement of portions of the units and such movement causes movement of the silicone grease with the result that energy is absorbed from the fuel and sound in the oil stream is minimized.

While the present invention has been described in connection with illustrative details of two embodiments, it should be understood that these details are not intended to be limitative of the invention except as set forth in the accompanying claims.

What is claimed as new and desired to be secured by Letters Patent of the United States is:

1. A vibration absorber including a sealed container having a wall portion movable in response to vibrations to change the volume of said container and silicone grease partly filling the interior of said container and contacting said wall portion whereby said movements of said wall portion effect movements of said silicone grease into and out of the unfilled portion of the interior of said container.

2. A vibration absorber including a sealed container having a wall portion movable in response to vibrations to change the volume of said container and noncompressible and nonresilient energy absorbing material partly filling the interior of said container and contacting said wall portion whereby said movements of said wall portion produce movement of said material into and out of the unfilled part of said container.

3. A vibration absorber including a sealed container having opposed wall portions, at least one of which is movable relative to the other in response to vibrations to change the volume of said container, and noncompressible and nonresilient energy absorbing material partly filling the interior of said container and extending between said wall portions whereby said movements of said wall portions effect movement of said material into and out of the unfilled portion of said container.

4. Vibration absorbing apparatus including a container adapted to form part of a fluid passageway, a series of tubular spacers placed lengthwise of the container, units including vibration absorbing material mounted within said container, said units each being located between adjacent spacers and held in assembled spaced relation by said spacers, and there being longitudinal passageways between the spacers and container and passageways from within said spacers to said longitudinal passageways.

5. Vibration absorbing apparatus, including in combination, a tubular housing having a series of angularly spaced apart inwardly extending projections running lengthwise of the housing, a series of tubular spacers within said housing and cooperating with said projections to define longitudinal passageways, said spacers also having angularly spaced apart passageways leading from the interior of each spacer to said longitudinal passageways, and vibration absorbing units mounted between at least certain of said spacers, said units having outwardly extending flanges held between said spacers.

6. Vibration absorbing apparatus, including in combination, a tubular housing having a series of angularly spaced apart inwardly extending projections running lengthwise of the housing, a series of tubular spacers fitting within said housing and cooperating with said projections to define longitudinal passageways, said spacers also having angularly spaced apart passageways leading from the interior of each spacer to said longitudinal passageways, and vibration absorbing units mounted between at least certain of said spacers.

7. Vibration absorbing apparatus, including in combination, a tubular housing having a series of angularly spaced apart inwardly extending projections running lengthwise of the housing, a series of tubular spacers fitting within said housing and cooperating with said projections to define longitudinal passageways, said spacers also having angularly spaced apart passageways leading from the interior of each spacer to said longitudinal passageways, and vibration absorbing units mounted between at least certain of said spacers, said units having outwardly extending flanges held between said spacers and said flanges being of such width as to space the side walls of said units from the inner walls of the spacers, and said spacers and units being so dimensioned that the end walls of the units are spaced from each other.

8. Vibration absorbing apparatus, including in combination, a tubular housing, a series of tubular spacers mounted within said housing, said spacers having angularly spaced apart longitudinally extending passageways at their exterior, said spacers also having angularly spaced apart passageways at one end leading from the interior of each spacer to said longitudinal passageways, and vibration absorbing units mounted between at least certain of said spacers, and the spacers between adjacent units being placed back to back with the passageways in alignment.

9. Vibration absorbing apparatus, including in combination, a tubular housing, a series of tubular spacers fitting within said housing, said spacers having angularly spaced apart longitudinally extending passageways at their exterior, said spacers each having an inner peripheral recess at one end and angularly spaced apart passageways at the opposite end leading from the interior of the spacer to said longitudinal passageways, and vibration absorbing units mounted between at least certain of said spacers and being received in said peripheral recesses, the spacers between adjacent units being placed back to back with the passageways in alignment.

10. A vibration absorber including a sealed container having opposed wall portions, at least one of which is movable and formed with concentric, radially spaced corrugations, and noncompressible and nonresilient energy absorbing material partially filling the interior of said container and extending between said wall portions.

11. Vibration absorbing apparatus including a container adapted to form part of a fluid passageway, a series of tubular spacers, and vibration absorbing units mounted within said container, said units having a movable wall and being partially filled with noncompressible and nonresilient energy absorbing material in contact with said movable wall, said units each being located between adjacent spacers and held in assembled spaced relation by said spacers.

12. Vibration absorbing apparatus, including in combination, a tubular housing, a series of tubular spacers mounted within said housing, said spacers having angularly spaced apart longitudinally extending passageways at their exterior, said spacers also having angularly spaced apart passageways at one end leading from the interior of each spacer to said longitudinal passageways, and vibration absorbing units mounted between at least certain of said spacers and each having a movable wall portion, said units being partially filled with noncompressible and nonresilient energy absorbing material in contact with said movable wall portion, and the spacers between adjacent units being placed back to back with the passageways in alignment.

13. Vibration absorbing apparatus comprising a container adapted to form a portion of a fluid passageway, a plurality of separate sealed units each comprising a movable wall portion and containing a noncompressible and nonresilient vibratory energy absorbing material in contact with and actuated by movements of said wall, and supporting means for supporting the units in spaced relationship to each other in said container with their movable wall portions located so as to be acted upon by fluid flowing through the passageway.

References Cited in the file of this patent

UNITED STATES PATENTS

| | | |
|---|---|---|
| 734,749 | Rauch | July 28, 1903 |
| 1,003,620 | Lewis | Sept. 19, 1911 |
| 1,229,434 | Flockhart | June 12, 1917 |
| 1,402,896 | Schneebeli | Jan. 10, 1922 |
| 1,608,245 | Schwager | Nov. 23, 1926 |
| 1,658,349 | Moore | Feb. 7, 1928 |
| 1,825,465 | MacDonald | Sept. 29, 1931 |
| 1,927,947 | Newell | Sept. 26, 1933 |
| 1,975,483 | Scott | Oct. 2, 1934 |
| 2,553,539 | Bauer | May 22, 1951 |

FOREIGN PATENTS

| | | |
|---|---|---|
| 50,870 | Austria | June 15, 1911 |
| 308,866 | Germany | Sept. 15, 1917 |
| 58,537 | Holland | Nov. 15, 1946 |